United States Patent
Kimura

(10) Patent No.: US 11,098,833 B2
(45) Date of Patent: Aug. 24, 2021

(54) QUICK CONNECTOR

(71) Applicant: PIOLAX, INC., Yokohama (JP)

(72) Inventor: Takashi Kimura, Yokohama (JP)

(73) Assignee: PIOLAX, INC., Yokohama (JP)

( * ) Notice: Subject to any disclaimer, the term of this patent is extended or adjusted under 35 U.S.C. 154(b) by 314 days.

(21) Appl. No.: 16/344,421

(22) PCT Filed: Oct. 24, 2017

(86) PCT No.: PCT/JP2017/038299
§ 371 (c)(1),
(2) Date: Apr. 24, 2019

(87) PCT Pub. No.: WO2018/079530
PCT Pub. Date: May 3, 2018

(65) Prior Publication Data
US 2020/0056730 A1   Feb. 20, 2020

(30) Foreign Application Priority Data
Oct. 28, 2016   (JP) .............................. JP2016-212288

(51) Int. Cl.
*F16L 37/088*   (2006.01)
*F16L 37/12*   (2006.01)

(52) U.S. Cl.
CPC ......... *F16L 37/0885* (2019.08); *F16L 37/088* (2013.01); *F16L 37/1205* (2013.01)

(58) Field of Classification Search
CPC . F16L 37/0841; F16L 37/088; F16L 37/0885; F16L 37/1205; F16L 37/133; F16L 37/138

(Continued)

(56) References Cited

U.S. PATENT DOCUMENTS 3,922,011 A   11/1975  Walters
5,211,427 A   5/1993   Washizu
(Continued)

FOREIGN PATENT DOCUMENTS

JP   S63-171795 U1   11/1988
JP   H02-005696 U1   1/1990
(Continued)

OTHER PUBLICATIONS

International Search Report (ISR) (PCT Form PCT/ISA/210), in PCT/JP2017/038299, dated Jan. 16, 2018, and English Translation thereof.

(Continued)

*Primary Examiner* — Aaron M Dunwoody
(74) *Attorney, Agent, or Firm* — McGinn IP Law Group, PLLC

(57) ABSTRACT

A quick connector includes a tubular socket, a wire retainer attached to an outer circumferential surface of the socket, and a guide member provided inside of the socket. The wire retainer has a lock portion which engages with a flange of a first tubular body when the guide member is at a second position. An outer circumferential surface of the guide member is formed with a holding recess in which the lock portion is fitted when the guide member is at a first position, and a wall of a pair of walls forming the holding recess is formed with a tapered guide surface that extends radially outward. The tapered guide surface guides the wire retainer so that the wire retainer goes over the flange when the first tubular body is inserted.

4 Claims, 7 Drawing Sheets

(58) Field of Classification Search
USPC .......................... 285/81, 305, 307, 319, 321
See application file for complete search history.

(56) References Cited

U.S. PATENT DOCUMENTS

| | | | |
|---|---|---|---|
| 5,860,677 A * | 1/1999 | Martins ................. | F28F 9/0246 |
| | | | 285/26 |
| 2006/0145475 A1 | 7/2006 | Walker et al. | |
| 2014/0197629 A1* | 7/2014 | Barthel ................. | F16L 37/138 |
| | | | 285/93 |

FOREIGN PATENT DOCUMENTS

| | | |
|---|---|---|
| JP | H 04-071957 U1 | 6/1992 |
| JP | H04-224393 A | 8/1992 |
| JP | 2006-189156 A | 7/2006 |

OTHER PUBLICATIONS

Written Opinion of the International Searching Authority (PCT Form PCT/ISA/237), in PCT/JP2017/038299, dated Jan. 16, 2018.

* cited by examiner

QUICK CONNECTOR

TECHNICAL FIELD

The present invention relates to a quick connector for connecting tubular bodies such as pipes, hoses, tubes, and plumbing pipes to each other.

BACKGROUND ART

For example, plural pipes, hoses, tubes, etc. are routed in an internal combustion engine system, a brake system, and a fuel supply system (e.g., in a radiator) of an automobile. Connection between these members is made via a connector. Among such connectors is a quick connector which is equipped with a wire retainer and configured so as to enable one-touch, simple connection.

Among conventional quick connectors of this kind is one that is equipped with a socket that is to be connected to one tubular body and has slits extending in the circumferential direction and a wire retainer that is attached to the socket from outside and portions of which project inward through the slits beyond the inner circumferential surface of the socket. The other tubular body to be connected is formed with a flange having a tapered surface whose height decreases as the position goes in the direction in which the other tubular body is inserted into the socket. When the other tubular body to be connected is inserted into the socket, the wire retainer is pushed out and expanded from inside by the tapered surface of the flange. When the wire retainer has gone over the flange, the wire retainer recovers elastically and engages with a base-side portion of the flange, whereby the other tubular body is prevented from coming off and the two tubular bodies are connected to each other.

However, the above quick connector cannot be employed in a case that the flange provided in the other tubular body to be connected is not formed with, on the destination side of the push-in direction, a tapered surface capable of pushing out and expanding the wire retainer.

The following Patent document 1 discloses, as a quick connector that enables connection of pipes, a fluid quick connector which is equipped with a tubular portion having a flange, a tubular housing formed with apertures (slits), a retainer having projections that project through the apertures of the housing, and a sleeve that is set in the housing so as to move between a first position and a second position according to the engagement with the tubular portion while the tubular portion is being inserted into the housing. Nail-shaped projections project from the outer circumferential surface of the sleeve.

The sleeve is inserted into the housing, the projections of the outer circumferential surface of the sleeve are engaged with the inner circumferential surface of the housing by frictional forces, whereby the sleeve is held at the first position. Furthermore, the retainer is attached to the outer circumferential surface of the housing through apertures and increased in outer diameter by the sleeve (see FIG. 4 of Patent document 1). When the tubular portion is inserted into the sleeve in this state, the sleeve is pushed by the flange. When the sleeve is pushed to the second position, the retainer recovers to the original shape (i.e., reduced in diameter) and engages with the flange of the tubular portion. Thus, the tubular portion is engaged with and held by the housing (see FIG. 7 of Patent document 1).

CITATION LIST

Patent Literature

Patent document 1: JP-A-2006-189156

SUMMARY OF INVENTION

Technical Problem

However, in the fluid quick connector of the above Patent document 1, the sleeve is held at the first position merely in such a manner that the projections provided on the outer circumferential surface of the sleeve are engaged with the inner circumferential surface of the housing by frictional forces. This may cause an event that the sleeve is moved unexpectedly from the first position to the second position in the housing before insertion of the tubular portion into the housing. If the sleeve is moved to the second position in the housing in this manner, the retainer is reduced in diameter and hence the tubular portion cannot be inserted into the housing.

An object of the present invention is therefore to provide a quick connector capable of being applied reliably to also a tubular body in which a flange does not have a tapered surface capable of pushing and expanding a retainer on the destination side of a push-in direction.

Solution to Problem

To attain the above object, the invention provides a quick connector for connecting a second tubular body to a first tubular body having a tubular tip portion and a flange provided on an outer circumferential surface of the tip portion, characterized by comprising a tubular socket to which the second tubular body is to be connected on the side of one end and into which the first tubular body is inserted on the side of the other end; a wire retainer attached to an outer circumferential surface of the socket; and a guide member which is set inside an inner circumferential surface of the socket, the quick connector further characterized in that the guide member is set so as to be movable from a first position in the socket to a second position that is closer to the one end of the socket than the first position is; that the socket is formed with slits that extend in the circumferential direction; that the wire retainer has lock portions which project beyond the inner circumferential surface of the socket through the slits and engage with the flange in a state that the guide member is located at the second position, and thereby prevent the first tubular body from coming off; that a tip portion of the first tubular body can be inserted into the guide member, an inner circumferential surface of the guide member is formed with an engagement portion with which the flange of the first tubular body engages, an outer circumferential surface of the guide member is formed with, by a pair of walls opposed to each other in the axial direction, a holding recess in which the lock portions of the wire retainer are fitted in a state that the guide member is located at the first position, and of the pair of walls of the holding recess a wall located on the side of the other end of the socket is formed with a tapered guide surface that extends outward as the position goes to the other end of the socket; and that the engagement portion is located closer to the other end of the socket than the holding recess is, and the tapered guide surface guides the wire retainer as it goes over the flange when the first tubular body is inserted.

Advantageous Effects of Invention

In the above-described invention, when the first tubular body is inserted into the socket from the inner circumference at its other end starting from a state that the guide member is held at the first position in the socket, the flange engages with the engagement portion of the guide member, whereby the guide member is moved toward the second position. When the lock portions of the wire retainer have gone over the flange while being guided by the tapered guide surface, the lock portions engage with a portion, located on the side of the other end of the socket, of the flange. As a result, the first tubular body is prevented from coming off the socket and the first tubular body and the second tubular body can be connected to each other via the socket.

As a result, even in a case that the outer circumferential surface of the flange of the first tubular body is not tapered in the direction in which the first tubular body is inserted into the quick connector (i.e., the flange is shaped like a mere ring-shaped plate), the guide member guides the lock portions of the wire retainer then they go over the flange. This increases the versatility of the quick connector.

Furthermore, since the lock portions of the wire retainer are fitted into the holding recess of the guide member, an unexpected movement of the guide member 40 can be restricted in a temporarily held state and the guide member being in the temporarily held state can be prevented from moving to the second position.

DESCRIPTION OF EMBODIMENTS

An embodiment of a quick connector according to the present invention will be hereinafter described with reference to FIGS. 1-9.

Figure 1:
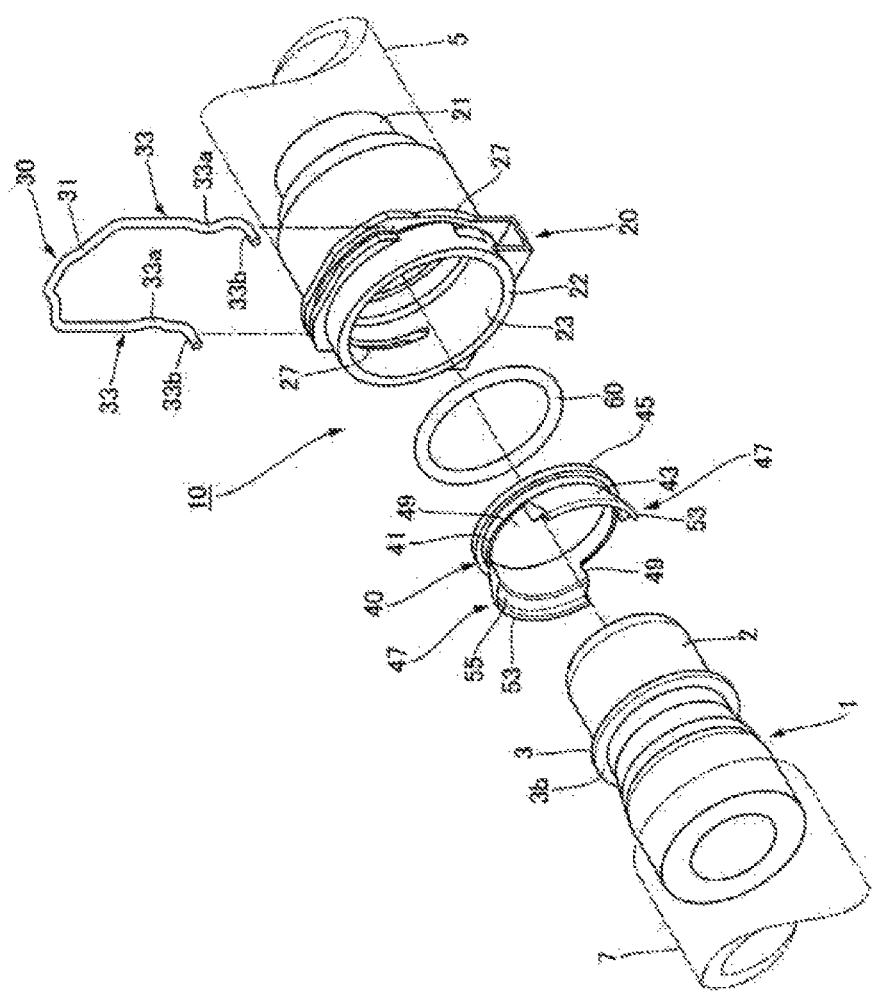
FIG. 1 is an exploded perspective view of an embodiment of a quick connector according to the present invention.

As shown in FIG. 1, this quick connector 10 is to connect a second tubular body 5 to a first tubular body 1 having a tubular tip portion 2 and a flange 3 which is provided on an outer circumferential surface of the tubular tip portion 2. The flange 3 which is provided on the first tubular body 1 is shaped like a ring-shaped plate and projects from the outer circumferential surface of the tubular tip portion 2 perpendicularly to an axis C1 (see FIG. 6) of the first tubular body 1.

Figure 6:
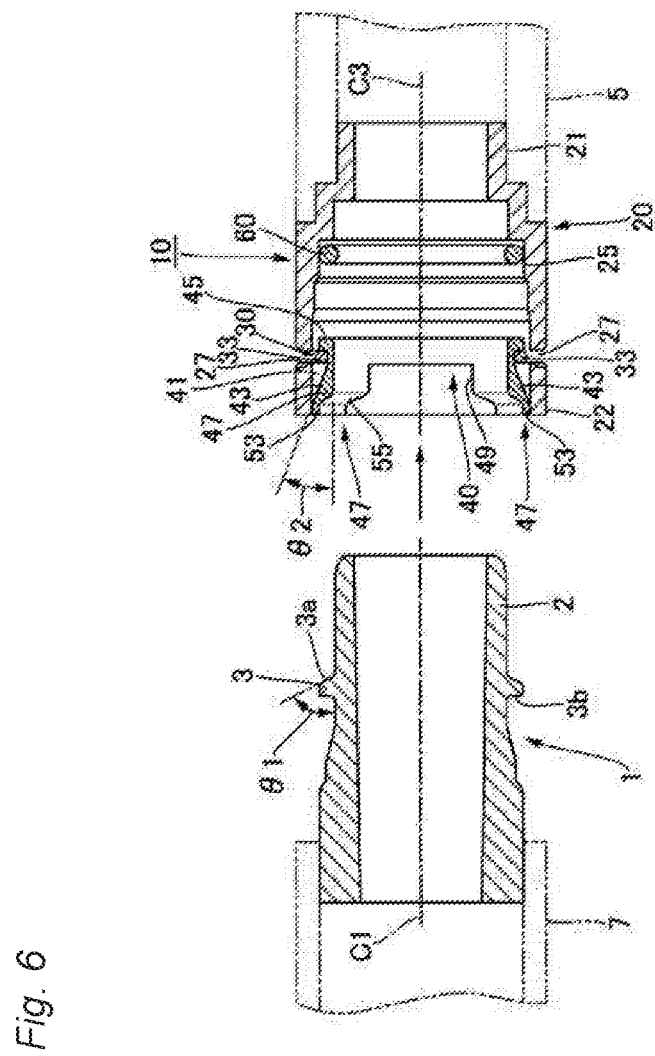
FIG. 6 is an explanatory sectional view showing a first use state of the same quick connector.

As shown in FIG. 6, a tip surface 3a (located on the tip side in a direction in which the first tubular body 1 is inserted into the inner circumferential surface of a socket 20 (described later)) of the flange 3 is tapered in such a manner that its height decreases gradually as the position goes in the direction of insertion into the socket 20. The inclination angle θ1 (with respect to the axis C1 of the first tubular body 1) of the tip surface 3a is set at such an angle as to cause difficulty pushing and expanding lock portions 33 (see FIG. 1) of a wire retainer 30 (described later) from inside. Furthermore, as shown in FIG. 6, a base-side end surface 3b (i.e., a surface that is opposite to the tip surface 3a and is to be located on the side of the other end 22 of the socket 20) of the flange 3 is a flat surface that is approximately perpendicular to the axis C1 of the first tubular body 1. The lock portions 33 of the wire retainer 30 (described later) can be locked on the base-side end surface 3b (see part (C) of FIG. 7).

Although in this embodiment a tubular body 7 which is separate from the first tubular body 1 is to be connected to a base-side outer circumferential surface of the first tubular body 1, naturally it is not always necessary to connect a separate tubular body to the first tubular body 1 (i.e., the first tubular body itself is made a long tubular body formed with a flange).

Example tubular bodies to be connected to each other via the quick connector 10 are pipes, hoses, tubes, etc. used in an internal combustion engine system, a brake system, and a fuel supply system (e.g., in a radiator) of an automobile; however, other tubular bodies may be connected to each other via the quick connector 10. In the invention, the term "tubular body" means a body that is tubular such as a pipe, a hose, a tube, or the like. For convenience of description, the separate tubular body 7 that is connected to the first tubular body 1 and the second tubular body 5 are omitted in FIGS. 4, 5, and parts (A) and (B) of FIG. 7.

As shown in FIG. 1, the quick connector 10 according to the embodiment is equipped with the tubular socket 20, the wire retainer 30 which is attached to the outer circumferential surface of the flange 3, and a guide member 40 which is set inside the inner circumferential surface of the socket 20.

The socket 20 is approximately shaped like a cylinder that is open on the side of one end 21 and on the side of the other end 22 in the axial direction. The socket 20 has, on the side of the one end 21, a portion to which the second tubular body 5 is to be connected and has, on the side of the other end 22, an opening 23 into which the first tubular body 1 is to be inserted.

Figure 5:
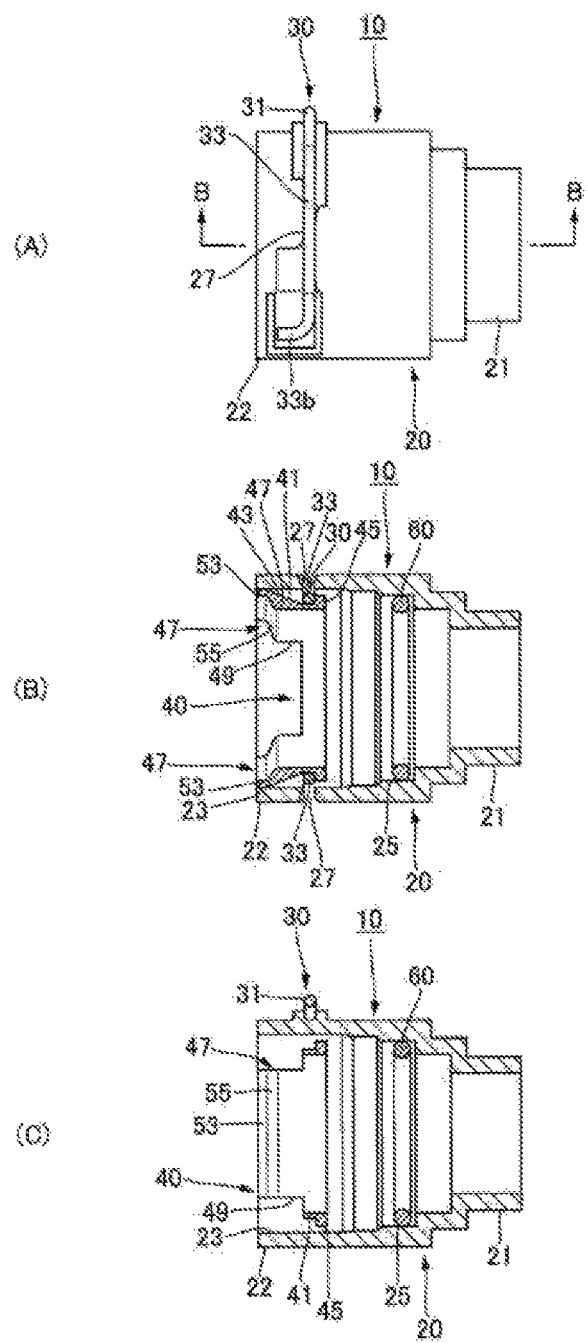
FIG. 5 Part (A) is a side view in the state of FIG. 4, part (B) is a sectional view taken along an arrowed line B-B in part (A), part (C) is a vertical sectional view of part (A).

As shown in part (B) of FIG. 5, the inner surface of the socket 20 is shaped in such a manner that the inner diameter decreases stepwise in the direction from the opening 23 located at the other end 22 to the side of the one end 21 and is formed with a seal ring setting portion 25 at a deep position in the stepwise structure. A ring-shaped seal ring 60 is set in the seal ring setting portion 25. The tip portion 2 of the first tubular body 1 is inserted into the seal ring 60, whereby airtight sealing is established between the socket inner circumferential surface and the outer circumferential surface of the first tubular body 1 (see part (C) of FIG. 7).

The socket 20 is formed with slits 27 which extend in the circumferential direction. In this embodiment, as shown in FIG. 1 and part (B) of FIG. 5, a pair of slits 27 which communicate with the socket inside space are formed so as to extend in the circumferential direction on the side of the other end 22 of the socket 20 at two respective side positions, opposed to each other, on a circumference.

The shape of the socket is not limited to the above shape, and the slits may be formed not in pair.

The wire retainer 30, which is formed by bending a wire, is attached to the outer circumferential surface of the socket 20. In a state that the guide member 40 is set in the socket 20 at a second position (see part (C) of FIG. 7), the guide member 40 is engaged with the flange 3 (in this case, the base-side end surface 3b of the flange 3) of the first tubular body 1 that is inserted in the inner circumferential surface of a portion, located on the side of the other end 22, of the socket 20, whereby the guide member 40 prevents the first tubular body 1 from coming off and connects the first tubular body 1 to the socket 20.

As shown in FIG. 1, the wire retainer 30 employed in this embodiment is composed of a base portion 31 which is bent so as to have a central mountain shape and a pair of lock portions 33 which are bent so as to be approximately perpendicular to the base portion 31 and extend parallel with each other. Thus, the wire retainer 30 is bent so as to be approximately shaped like a gate. The pair of lock portions 33 are inserted in the pair of slits 27 and project into the inside space of the socket 20 through the slits 27 on the side of the other end 22.

Each lock portion 33 has a small bent portion 33a at a halfway position in its extension direction, and a tip portion 33b of each lock portion 33 in its extension direction is bent from the other portion of the lock portion 33 toward the opening 23 of the socket 20.

It suffices that the wire retainer be bent so as to assume, for example, a loop shape. There are no particular limitations on the shape of the wire retainer except that it should be inserted in the slits formed in the socket and has the lock portions that project into the inside space of the socket through the slits.

Next, the guide member 40 will be described in detail. When the first tubular body 1 is inserted into the inner circumferential surface of the socket 20, the guide member 40 is placed on the tip side, in the insertion direction, of the flange 3 of the first tubular body 1 and covers the tip surface 3a of the flange 3 and its guide surface is set on the outer circumferential surface of the flange 3. As such, the guide member 40 serves as a member that allows the first tubular body 1 to be pushed into the socket 20 without the flange 3's being caught on the lock portions 33 of the wire retainer 30 and guides the lock portions 33 when they go over the flange 3.

As shown in FIG. 6, in a state before insertion of the first tubular body 1, the guide member 40 is located on the side of the other end 22 (i.e., located at a first position) in the socket 20. After the first tubular body 1 is inserted, the guide member 40 is pushed by the first tubular body 1, whereby the guide member 40 can be moved to a position (i.e., second position) that is closer to the one end 21 of the socket 20 than the first position is (see part (C) of FIG. 7).

The tip portion 2 of the first tubular body 1 can be inserted into the guide member 40. The inner circumferential surface of the guide member 40 is formed with an engagement portion 55 with which the flange 3 of the first tubular body 1 is to engage. The outer circumferential surface of the guide member 40 is formed with a holding recess 41 by a pair of walls 45 and 47 that are opposed to each other in the axial direction. Of the pair of walls 45 and 47 of the holding recess 41, the wall 47 which is set on the side of the other end 22 of the socket 20 has a tapered guide surface 43 which extends outward and toward the other end 22 of the socket 20.

A more specific description will be made with reference to FIGS. 2 and 3. The guide member 40 employed in this embodiment approximately shaped like a ring as a whole.

The wall 45 like a ring-shaped projection projects from a tip-side outer circumferential surface of the guide member 40. The other wall 47 projects from the outer circumferential surface of a portion that is distant from the wall 45 in the axial direction and is to be located on the side of the other end of the socket 20 when the guide member 40 is set inside the socket 20. This pair of walls 45 and 47 form the holding recess 41 on the outer circumferential surface of the guide member 40. The outer circumferential surface of the wall 47 which is located on the side of the other end 22 of the socket 20 is the tapered guide surface 43. In the following description, the wall 47 whose outer circumferential surface is the tapered guide surface 43 will be referred to as a "guide wall 47."

Figure 7:
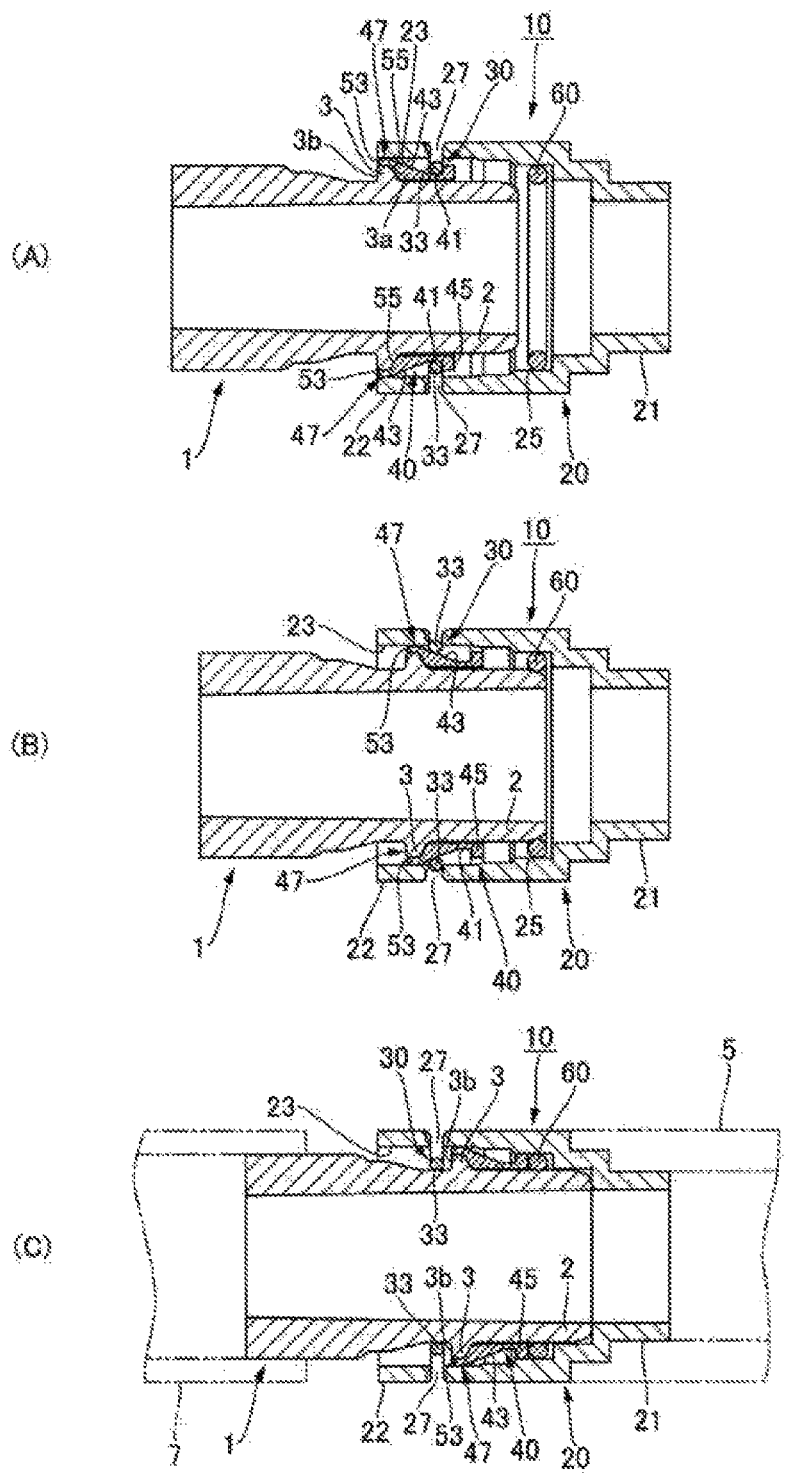
FIG. 7 show use states of the same quick connector; part (A) is a sectional view showing a second use state, part (B) is a sectional view showing a third use state, and part (C) is a sectional view showing a fourth use state.

As shown in FIG. 6, the inclination angle $\theta 2$ of the tapered guide surface 43 with respect to the axis C2 of the guide member 40 is set so that the tapered guide surface 43 can go inside the pair of lock portions 33 of the wire retainer 30 and push and expand the pair of lock portions 33 from inside when the guide member 40 is pushed in by the first tubular body 1 to move the guide member 40 from the first position (see FIG. 6) to the second position (see part (C) of FIG. 7) in the socket 20. The inclination angle $\theta 2$ of the tapered guide surface 43 is set smaller than the inclination angle $\theta 1$ of the tip surface 3a of the flange 3 of the first tubular body 1 with respect to the axis C1 of the first tubular body 1.

Furthermore, the guide wall 47 whose outer circumferential surface is the tapered guide surface 43 extends in the circumferential direction in such a manner as to be divided into two portions by cuts 49, and thereby given proper elasticity. In this embodiment, as shown in FIGS. 2 and 3, the pair of cuts 49 are formed in the guide member 40 at circumferential positions opposed to each other. The guide wall 47 is in such a form as to be divided into a pair of guide walls 47 by the cuts 49. Alternatively, three or more cuts may be formed so as to for three or more guide walls; there are no particular limitations in this respect.

Each guide wall 47 has a base portion 51 whose outer circumferential surface is a tapered guide surface 43 and a tip portion 53 which extends along the axis C2 of the guide member 40 from the tip, in its extension direction, of the base portion 51. The tip portions 53 of the guide walls 47 come into elastic contact with the inner circumferential surface of the socket 20 in a state that the guide member 40 is inserted in the inner circumferential surface of the socket 20 (see FIG. 6).

Figure 3:
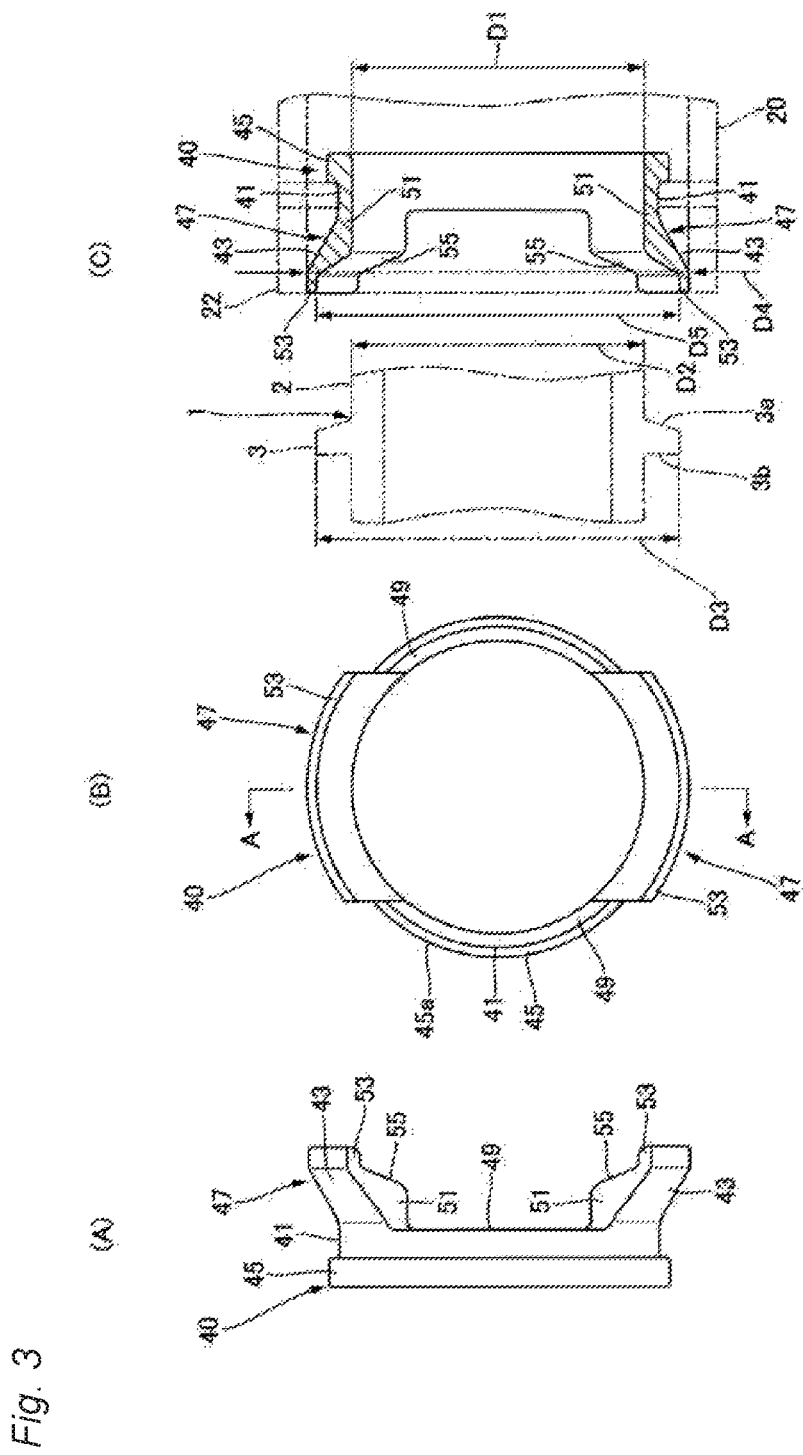
FIG. 3 shows the guide member; part (A) is a left side view, part (B) is a front view, and part (C) is a sectional view taken along an arrowed line A-A in part (B).

Furthermore, as shown in part (C) of FIG. 3, the inner diameter D1 (in this example, the inner diameter of the base portions 51 of the guide walls 47) of the guide member 40 is set larger than the outer diameter D2 of the tip portion 2 of the first tubular body 1 and smaller than the outer diameter D3 of the flange 3 of the first tubular body 1. As a result, the tip portion 2 of the first tubular body 1 can be inserted into the inner circumferential surface of the guide member 40 and the flange 3 of the first tubular body 1 can engage with the engagement portions 55 (formed in the inner circumferential surface of the guide member 40) of the guide wall 47.

As shown in part (C) of FIG. 3, the outermost diameter D4 of the tapered guide surfaces 43 is set larger than the outer diameter D3 of the flange 3 of the first tubular body 1. This prevents the lock portions 33 of the wire retainer 30 from hitting the tip surface 3a of the flange 3 when the guide member 40 is inserted from the opening 23, located at the other end 22, of the socket 20 and the lock portions 33 of the wire retainer 30 are moved being guided by the tapered guide surfaces 43.

Furthermore, as shown in part (C) of FIG. 3, the inner circumferential surface of the base portion 51 of each guide wall 47 is formed with the engagement portion 55 which is a tapered surface that goes out gradually as the position goes toward the opening 23, located at the other end 22, of the socket 20 and with which the flange 3 of the first tubular body 1 is to engage.

In this quick connector 10, as shown in part (C) of FIG. 3, the engagement portions 55 are located closer to the other end 22 of the socket 20 than the holding recess 41 is. And the tapered guide surfaces 43 are formed so as to guide the wire retainer 30 so that it goes over the flange 3 when the first tubular body 1 is inserted.

The engagement portions 55 have such an inclination angle as to conform to the tapered shape of the tip surface 3a of the flange 3 of the first tubular body 1 (see part (A) of FIG. 7). The inner circumferential surface of the guide wall 47, which includes the engagement portion 55 which is a tapered surface, is shaped so as to cover the outer circumferential surface of the flange 3 of the first tubular body 1. That is, in this embodiment, the engagement portions 55 are (i.e., also serve as) "tapered portions" of the invention. The engagement portions may be provided separately from the tapered portions.

In this embodiment, as shown in part (C) of FIG. 3, the inner diameter D5 of the tip portions 53 of the guide walls 47 is larger than the outer diameter D3 of the flange 3 of the first tubular body 1 and the tip portions 53 of the guide walls 47 extend by a length that is suitable for the length, in the axial direction, of the first tubular body 1 (see part (A) of FIG. 7). As a result, as shown in (A) to (C) of FIG. 7, when the first tubular body 1 is inserted into the socket 20 from its opening 23 located at the other end 22, the tip portions 53 of the guide walls 47 can cover the outer circumferential surface of the flange 3 of the first tubular body 1.

The shape of the guide members is not limited to the above shape. It suffices that each guide member be shaped in such a manner that its inner surface is formed with an engagement portion with which the flange of the first tubular body is to engage and, in a state that the guide member is located at the first position in the socket, the outer circumferential surface of the guide member be formed with a holding recess in which the associated lock portion of the wire retainer is to be fitted and whose wall on the side of the other end of the socket serve as a tapered guide surface.

When the first tubular body 1 is inserted into the guide member 40 having the above structure that is located at the first position in the socket 20 (see FIG. 6), the flange 3 engages with the engagement portions 55 which are inner circumferential surfaces of the guide member 40 (see part (A) of FIG. 7), the guide member 40 is moved toward the second position in the socket 20, and the engagement portions 33 of the wire retainer 30 go over the flange 3 while being guided by the tapered guide surfaces 43 (see part (B) of FIG. 7) and engage with the portion (base-side end surface 3b), located on the side of the other end of the socket 20, of the flange 3 (see part (C) of FIG. 7).

Figure 4:
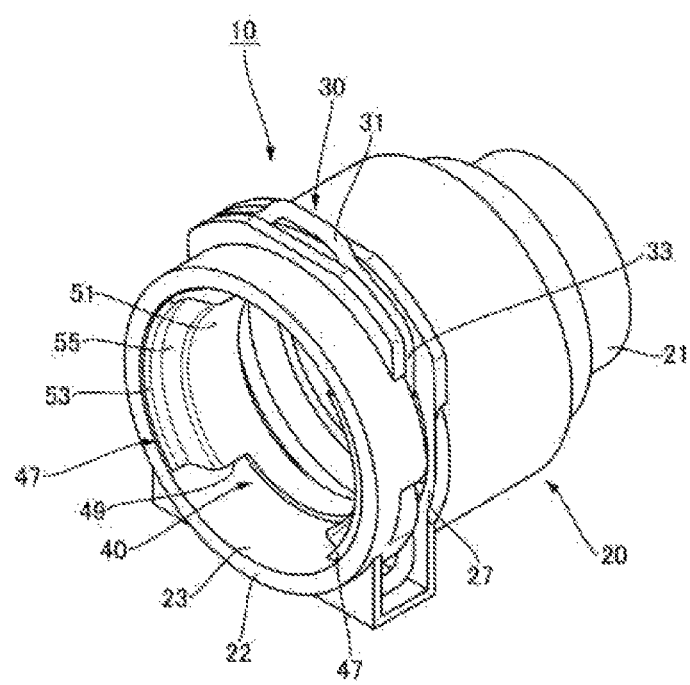
FIG. 4 is a perspective view of the quick connector in a state that the guide member is held at a first position in the socket.

In this embodiment, as shown in FIG. 4, part (B) of FIGS. 5, and 6, after the guide member 40 is inserted into the socket 20 from its opening 23 located at the other end 22, the wire retainer 30 is attached to the outer circumferential portion of the socket 20 and its pair of lock portions 33 are caused to project inside the socket through the pair of slits 27. In this manner, the pair of lock portions 33 are locked on the holding recess 41 of the guide member 40, whereby the guide member 40 is held by the socket 20 at the first position.

In this state, the tip portion 2 of the first tubular body 1 is inserted into the socket 20 from its opening 23 located at the other end 22. As a result, as shown in part (A) of FIG. 7, the tip portion 2 of the first tubular body 1 is inserted into the inner circumferential surface of the guide member 40, the tip surface 3a of the flange 3 is engaged with the engagement portions 55 of the guide walls 47, and the tip portions 53 of the guide walls 47 are located outside the flange 3 (i.e., the outer circumferential surface of the flange 3 is covered with the tip portions 53 of the guide walls 47).

When the first tubular body 1 is further inserted into the inner circumferential surface of the socket 20, the guide member 40 which is engaged with the flange 3 is pushed inward so as to move from the first position to the second position. As a result, as shown in part (B) of FIG. 7, the lock portions 33 of the wire retainer 30 are guided by the tapered surfaces 43 of the guide member 40 and the tapered surfaces 43 push and expand the pair of lock portions 33 of the wire retainer 30 from inside (i.e., increase their distance). When the pair of lock portions 33 have gone over the top of the flange 3 of the first tubular body 1 with the tapered guide surfaces 43 interposed between them, the pair of lock portions 33 recover elastically and engage with the base-side end surface of the flange 3 of the first tubular body 1 (see part (C) of FIG. 7).

Next, an example use method of the first tubular body 1 having the above configuration will be described.

First, as shown in FIG. 1, after the pair of guide walls 47 of the guide member 40 are registered with the pair of slits 27 of the socket 20, the guide member 40 is inserted into the inner circumferential surface of the socket 20 from its opening 23 located at the other end 22 and pushed in to the position where its holding recess 41 is registered with the pair of slits 27, and the holding recess 41 is positioned with respect to the pair of slits 27. In this state, the tip portions 53 of the respective guide walls 47 are in elastic contact with the inner circumferential surface of the socket 20 (see FIG. 6).

Then the pair of lock portions 33 of the wire retainer 30 are registered with the pair of slits 27, whereby the holding recess 41 of the guide member 40 is positioned with respect to the pair of lock portions 33 of the wire retainer 30. In this state, the wire retainer 30 is pushed into the socket from its outer circumferential surface. The pair of lock portions 33 of the wire retainer 30 are caused to project beyond the inner circumferential surface of the socket 20, whereby the pair of lock portions 33 are fitted into the holding recess 41 of the guide member 40. The guide member 40 can thus be held by the socket 20 at the first position.

In the above-described manner, in the quick connector 10, the pair of lock portions 33 of the wire retainer 30 are fitted into the holding recess 41 of the guide member 40 in a state that the guide member 40 is located at the first position in the socket 20. This makes it possible to restrict an unexpected movement of the guide member 40 from the first position in the socket 20 and to prevent the guide member 40 from getting out of the temporarily held state and moving to the second position in the socket 20

In this embodiment, as described above, the tip portions 53 of the respective guide walls 47 whose outer circumferential surfaces are formed so as to be in elastic contact with the tapered guide surfaces 43 in a state that the guide member 40 is inserted in the inner circumferential surface of the socket 20 (see FIG. 6). Thus, before the pair of lock portions 33 of the wire retainer 30 are locked on the holding recess 41 of the guide member 40 (see FIGS. 4 and 6), the guide member 40 is held at the prescribed position inside the inner circumferential surface of the socket 20 and can thus be made less mobile. As a result, the holding recess 41 of the guide member 40 can be positioned easily with respect to the pair of lock portions 33 of the wire retainer 30 and can be fitted into the holding recess 41 of the guide member 40 easily.

As described above, the tip portion 2 of the first tubular body 1 is inserted into the socket 20 from its opening 23 located at the other end 22 in a state that the guide member 40 is held at the first position in the socket 20 (see FIG. 6). As a result, as shown in part (A) of FIG. 7, the tip portion 2 of the first tubular body 1 is inserted into the inner circumferential surface of the guide member 40, the tip surface 3a of the flange 3 is engaged with the engagement portions 55 of the guide walls 47, and the tip portions 53 of the guide walls 47 are located outside the flange 3 (i.e., the outer circumferential surfaces of the flange 3 is covered with the tip portions 53 of the guide walls 47).

Figure 2:
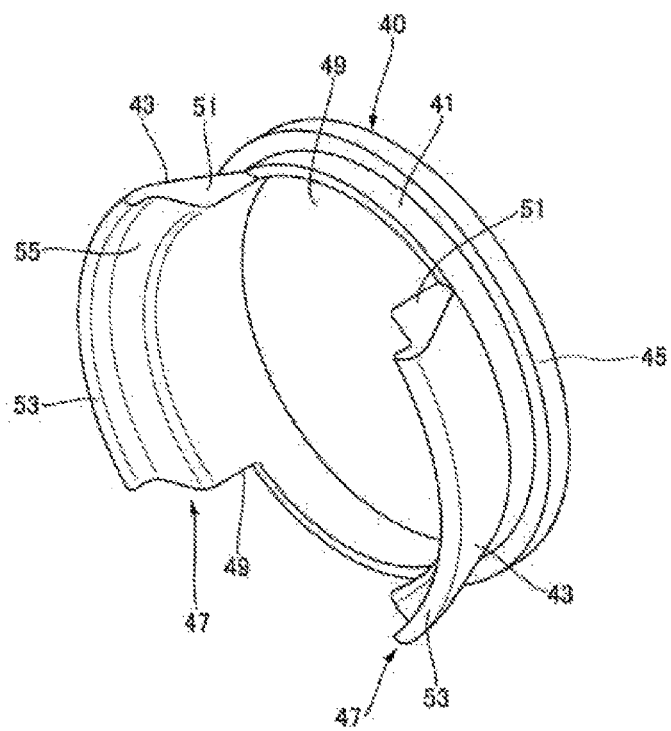
FIG. 2 is an enlarged perspective view of a guide member of the same quick connector.

At this time, in this embodiment, as shown in FIGS. 2 and 3, since the plural guide walls 47, formed with the tapered guide surfaces 43, of the guide member 40 extend in the circumferential direction (separated by the cuts 49), each guide wall 47 is given proper elasticity and hence can be warped easily. As a result, for example, even if the outer diameter D3 of the flange 3 of the first tubular body 1 has a dimensional variation, it can be absorbed flexibly and the flange 3 of the first tubular body 1 can be brought into firm contact with the inner circumferential surface of the guide member 40.

The inner circumferential surface of each guide wall 47 which is formed with the tapered guide surface 43 includes the tapered surface (in this example, engagement portion 55) that goes outward gradually as the position goes toward the opening 23, located at the other end, of the socket 20 and is shaped so as to cover the outer circumferential surface of the flange 3 of the first tubular body 1. Thus, even if the first tubular body 1 is inserted obliquely with respect to the axis C3 (see FIG. 6) of the socket 20, the tip portion 2 of the first tubular body 1 is guided by the inner tapered surfaces of the guide walls 47 and its insertion posture is thereby corrected, as a result of which the first tubular body 1 can be inserted into the socket 20 smoothly.

When the first tubular body 1 is further inserted into the inner circumferential surface of the socket 20 from the above-mentioned state shown in part (A) of FIG. 7, the guide member 40 being engaged with the flange 3 is pushed in so as to move from the first position to the second position in the socket 20. As a result, as shown in part (B) of FIG. 7, the lock portions 33 of the wire retainer 30 are guided by the tapered guide surfaces 43 of the guide member 40 and the tapered guide surfaces 43 expand the pair of lock portions 33 of the wire retainer 30 from inside and increases the distance between them in the opening direction.

When the pair of lock portions 33 of the wire retainer 30 have gone over the top of the flange 3 of the first tubular body 1 with the tapered guide surfaces 43 of the guide member 40 interposed between them, the pair of lock portions 33 recover elastically and engage with the base-side surface 3b of the flange 3 of the first tubular body 1 (see FIG. 7C). As a result, the first tubular body 1 is prevented from coming off through the opening 23, located at the other end 22, of the socket 20 and the first tubular body 1 and the second tubular body 5 can be connected to each other via the socket 20.

As described above, in the quick connector 10, even if the flange 3 of the first tubular body 1 which is inserted into the inner circumferential surface of the socket is not formed with a tapered surface having such an inclination angle as to be able to push and expand the wire retainer 30 from inside, the tapered guide surfaces 43 of the guide member 40 can guide the lock portions 33 of the wire retainer 30 so that it goes over the flange 3 of the first tubular body 1. As a result, even if the tip surface 3a of the flange 3 of the first tubular body 1 is not formed with a tapered surface, it suffices to prepare a guide member like the guide member 40 employed in the invention. This increases the versatility of the quick connector 10.

In the embodiment, as shown in part (C) of FIG. 3, since the outermost diameter D4 of the tapered guide surfaces 43 is larger than the outer diameter D3 of the flange 3 of the first tubular body 1, the lock portions 33 of the wire retainer 30 can easily go over the flange 3 of the first tubular body 1 when they are expanded being guided by the tapered guide surfaces 43 of the guide member 40.

Incidentally, when it is desired to disconnect the first tubular body 1 and the second tubular body 5 for such a reason as maintenance or replacement of a component, first, the base portion 31 of the wire retainer 30 is lifted up to establish a state that the pair of lock portions 33 have been pulled out of the pair of slits 27 so as not to project beyond the inner circumferential surface of the socket 20. As a result, the pair of lock portions 33 of the wire retainer 30 are unlocked from the base-side end surface 3b of the flange 3 of the first tubular body 1, and hence the first tubular body 1 can be pulled out through the opening 23, located at the other end 22, of the socket 20 and the first tubular body 1 and the second tubular body 5 can be disconnected from each other.

The invention is not limited to the above-described embodiment, and various modified embodiments are possible without departing from the spirit and scope of the invention. Such embodiments are also included in the scope of the invention.

DESCRIPTION OF SYMBOLS

1: First tubular body
2: Tip portion
3: Flange
5: Second tubular body
10: Quick connector
20: Socket
21: One end
22: The other end
27: Slit
30: Wire retainer
33: Lock portion
40: Guide member
41: Holding recess
43: Tapered guide surface
45: Wall
47: Wall (guide wall)
49: Cut
53: Tip portion
55: Engagement portion
60 Seal ring

The invention claimed is:

1. A quick connector for connecting a second tubular body to a first tubular body having a tubular tip portion and a flange provided on an outer circumferential surface of the tip portion, the quick connector characterized by comprising:
a tubular socket to which the second tubular body is connected on a side of one end and into which the first tubular body is inserted on a side of the other end;

a wire retainer attached to an outer circumferential surface of the socket; and a guide member which is provided inside an inner circumferential surface of the socket, the quick connector further characterized in:

that the guide member is set so as to be movable from a first position in the socket to a second position that is closer to the one end of the socket than the first position is;

that the socket is formed with slits that extend in the circumferential direction;

that the wire retainer has lock portions which project beyond the inner circumferential surface of the socket through the slits and engage with the flange in a state that the guide member is located at the second position, and thereby prevent the first tubular body from coming off;

that a tip portion of the first tubular body can be inserted into the guide member, an inner circumferential surface of the guide member is formed with an engagement portion with which the flange of the first tubular body engages, an outer circumferential surface of the guide member is formed with, by a pair of walls opposed to each other in the axial direction, a holding recess in which the lock portions of the wire retainer are fitted in a state that the guide member is located at the first position, and of the pair of walls of the holding recess a wall located on the side of the other end of the socket is formed with a tapered guide surface that extends outward as the position goes to the other end of the socket, in a state that the guide member is inserted in the inner circumferential surface of the socket and the lock portion is fitted in the holding recess so that the guide member is held at the first position, a tip portion of the wall that is formed with the tapered guide surface of the holding recess is in elastic contact with the inner circumferential surface of the socket, and a wall located on the side of the one end of the socket among the pair of walls is configured not to be in contact with the inner circumferential surface of the socket, and that the engagement portion is located closer to the other end of the socket than the holding recess is, and the tapered guide surface guides the wire retainer as it goes over the flange when the first tubular body is inserted.

2. The quick connector according to claim 1, wherein the outermost diameter of the tapered guide surface of the holding recess is larger than the outer diameter of the flange of the first tubular body.

3. The quick connector according to claim 1, wherein the wall that is formed with the tapered guide surface of the holding recess is divided by cuts into plural portions that extend in the circumferential direction.

4. The quick connector according to claim 1, wherein an inner circumferential surface of the wall that is formed with the tapered guide surface of the holding recess includes a tapered surface that goes outward gradually as the position goes toward an opening, located at the other end, of the socket and is shaped so as to cover an outer circumferential surface of the flange of the first tubular body.

* * * * *